United States Patent
Sirianni et al.

(10) Patent No.: US 12,526,319 B1
(45) Date of Patent: *Jan. 13, 2026

(54) AUTOMATED SECURITY COMPLIANCE FOR SYSTEM NODES

(71) Applicant: ARCHITECTURE TECHNOLOGY CORPORATION, Eden Prairie, MN (US)

(72) Inventors: Joseph Sirianni, Eden Prairie, MN (US); Judson Powers, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,120

(22) Filed: Nov. 15, 2022

Related U.S. Application Data

(63) Continuation of application No. 16/741,953, filed on Jan. 14, 2020, now Pat. No. 11,503,075.

(51) Int. Cl.
H04L 9/40 (2022.01)

(52) U.S. Cl.
CPC .......... *H04L 63/20* (2013.01); *H04L 63/1416* (2013.01)

(58) Field of Classification Search
CPC .......................... H04L 63/20; H04L 63/1416
See application file for complete search history.

(56) References Cited

U.S. PATENT DOCUMENTS

| | | |
|---|---|---|
| 4,895,518 A | 1/1990 | Arnold et al. |
| 5,115,433 A | 5/1992 | Baran et al. |

(Continued)

FOREIGN PATENT DOCUMENTS

| | | |
|---|---|---|
| CN | 101075917 A | 11/2007 |
| CN | 106709613 A | 5/2017 |

(Continued)

OTHER PUBLICATIONS

"Cybersecurity", U.S. Department of Defense Instruction, No. 8500. 01, Mar. 14, 2014, incorporating change effective Oct. 7, 2019, accessible at URL: https://www.esd.whs.mil/Portals/54/Documents/DD/issuances/dodi/850001_2014.pdf (58 pages).

(Continued)

*Primary Examiner* — Rachel J Hackenberg
(74) *Attorney, Agent, or Firm* — Foley & Lardner LLP

(57) ABSTRACT

Disclosed herein are embodiments of systems, methods, and products comprise an analytic server, which improves security of a system. The analytic server may monitor the system by retrieving status information from various devices within the system. The analytic server may generate an attack tree model based on a set of aggregation rules that are configured based on the monitored status information. The analytic server may detect one or more attacks by associating the status information with corresponding nodes of the attack tree model and executing a logic of the attack tree model. The analytic server may determine aggregated impact and risk metrics and calculate an impact score for each attack based on aggregated impact and risk metrics. The analytic server may generate reports comprising the one or more attacks ranked based on the impact scores. The analytic server may respond to one or more attacks by taking automated actions.

20 Claims, 4 Drawing Sheets

(56) References Cited

U.S. PATENT DOCUMENTS

| | | | |
|---|---|---|---|
| 5,440,723 A | 8/1995 | Arnold et al. | |
| 5,601,432 A | 2/1997 | Bergman | |
| 5,805,893 A | 9/1998 | Sproul et al. | |
| 5,944,783 A | 8/1999 | Nieten | |
| 5,974,549 A | 10/1999 | Golan | |
| 5,974,579 A | 10/1999 | Lepejian et al. | |
| 6,088,804 A | 7/2000 | Hill et al. | |
| 6,345,283 B1 | 2/2002 | Anderson | |
| 6,477,683 B1 | 11/2002 | Killian et al. | |
| 6,658,481 B1 | 12/2003 | Basso et al. | |
| 6,985,476 B1 | 1/2006 | Elliott et al. | |
| 7,043,663 B1* | 5/2006 | Pittelkow | G06F 11/2092 714/4.4 |
| 7,058,968 B2 | 6/2006 | Rowland et al. | |
| 7,107,347 B1 | 9/2006 | Cohen | |
| 7,228,566 B2 | 6/2007 | Caceres et al. | |
| 7,234,168 B2 | 6/2007 | Gupta et al. | |
| 7,257,630 B2 | 8/2007 | Cole et al. | |
| 7,317,733 B1 | 1/2008 | Olsson et al. | |
| 7,325,252 B2 | 1/2008 | Bunker et al. | |
| 7,372,809 B2 | 5/2008 | Chen et al. | |
| 7,496,959 B2 | 2/2009 | Adelstein et al. | |
| 7,522,908 B2 | 4/2009 | Hrastar | |
| 7,694,328 B2 | 4/2010 | Joshi et al. | |
| 7,743,074 B1 | 6/2010 | Parupudi et al. | |
| 7,748,040 B2 | 6/2010 | Adelstein et al. | |
| 7,818,804 B2 | 10/2010 | Marceau | |
| 7,886,049 B2 | 2/2011 | Adelstein et al. | |
| 7,925,984 B2 | 4/2011 | Awe et al. | |
| 7,930,353 B2 | 4/2011 | Chickering et al. | |
| 7,962,961 B1 | 6/2011 | Griffin et al. | |
| 8,079,080 B2 | 12/2011 | Borders | |
| 8,156,483 B2 | 4/2012 | Berg et al. | |
| 8,176,557 B2 | 5/2012 | Adelstein et al. | |
| 8,250,654 B1 | 8/2012 | Kennedy et al. | |
| 8,266,320 B1 | 9/2012 | Bell et al. | |
| 8,296,848 B1 | 10/2012 | Griffin et al. | |
| 8,307,444 B1 | 11/2012 | Mayer et al. | |
| 8,321,437 B2 | 11/2012 | Lim | |
| 8,341,732 B2 | 12/2012 | Croft et al. | |
| 8,407,801 B2 | 3/2013 | Ikegami et al. | |
| 8,433,768 B1 | 4/2013 | Bush et al. | |
| 8,458,805 B2 | 6/2013 | Adelstein et al. | |
| 8,490,193 B2 | 7/2013 | Sarraute Yamada et al. | |
| 8,495,229 B2 | 7/2013 | Kim | |
| 8,495,583 B2 | 7/2013 | Bassin et al. | |
| 8,499,354 B1 | 7/2013 | Satish et al. | |
| 8,554,536 B2 | 10/2013 | Adelman et al. | |
| 8,615,807 B1 | 12/2013 | Higbee et al. | |
| 8,862,803 B2 | 10/2014 | Powers et al. | |
| 8,869,235 B2 | 10/2014 | Qureshi et al. | |
| 8,893,278 B1 | 11/2014 | Chechik | |
| 9,076,342 B2 | 7/2015 | Brueckner et al. | |
| 9,081,911 B2 | 7/2015 | Powers et al. | |
| 9,083,741 B2 | 7/2015 | Powers | |
| 9,137,325 B2 | 9/2015 | Muhunthan et al. | |
| 9,197,649 B2 | 11/2015 | Carvalho | |
| 9,208,323 B1 | 12/2015 | Karta et al. | |
| 9,225,637 B2 | 12/2015 | Ramanujan et al. | |
| 9,246,936 B1 | 1/2016 | Belani et al. | |
| 9,280,911 B2 | 3/2016 | Sadeh-Koniecpol et al. | |
| 9,325,728 B1 | 4/2016 | Kennedy et al. | |
| 9,344,444 B2 | 5/2016 | Lippmann et al. | |
| 9,344,445 B2 | 5/2016 | Burns et al. | |
| 9,384,677 B2 | 7/2016 | Brueckner et al. | |
| 9,626,414 B2 | 4/2017 | Kanjirathinkal et al. | |
| 9,742,803 B1 | 8/2017 | Kras et al. | |
| 9,749,360 B1 | 8/2017 | Irimie et al. | |
| 9,836,598 B2 | 12/2017 | Iyer et al. | |
| 9,882,912 B2 | 1/2018 | Joo | |
| 10,079,850 B1 | 9/2018 | Patil et al. | |
| 10,083,624 B2 | 9/2018 | Brueckner et al. | |
| 10,223,760 B2 | 3/2019 | Ananthanpillai et al. | |
| 10,291,634 B2 | 5/2019 | Arzi et al. | |
| 10,291,638 B1 | 5/2019 | Chandana et al. | |
| 10,409,995 B1 | 9/2019 | Wasiq et al. | |
| 10,467,419 B1 | 11/2019 | Youngberg et al. | |
| 10,469,519 B2 | 11/2019 | Irimie et al. | |
| 10,540,502 B1 | 1/2020 | Joyce et al. | |
| 10,558,809 B1 | 2/2020 | Joyce et al. | |
| 10,581,868 B2 | 3/2020 | Kras et al. | |
| 10,659,488 B1 | 5/2020 | Rajasooriya et al. | |
| 10,686,811 B1 | 6/2020 | Ehle | |
| 10,749,890 B1* | 8/2020 | Aloisio | H04L 63/302 |
| 10,803,766 B1 | 10/2020 | Donovan et al. | |
| 10,817,604 B1 | 10/2020 | Kimball et al. | |
| 10,868,825 B1 | 12/2020 | Dominessy et al. | |
| 10,949,338 B1 | 3/2021 | Sirianni et al. | |
| 11,063,967 B2 | 7/2021 | Rego et al. | |
| 11,128,654 B1 | 9/2021 | Joyce et al. | |
| 11,158,207 B1 | 10/2021 | Sadeh-Koniecpol et al. | |
| 11,257,393 B2 | 2/2022 | Atencio et al. | |
| 11,258,806 B1* | 2/2022 | Berninger | H04L 63/1416 |
| 11,277,203 B1 | 3/2022 | McLinden et al. | |
| 11,652,839 B1* | 5/2023 | Aloisio | H04L 63/1433 726/25 |
| 2002/0038430 A1* | 3/2002 | Edwards | H04L 63/1416 726/26 |
| 2002/0073204 A1 | 6/2002 | Dutta et al. | |
| 2002/0078382 A1 | 6/2002 | Sheikh et al. | |
| 2002/0129264 A1 | 9/2002 | Rowland et al. | |
| 2002/0162017 A1 | 10/2002 | Sorkin et al. | |
| 2003/0056116 A1 | 3/2003 | Bunker et al. | |
| 2003/0182582 A1 | 9/2003 | Park et al. | |
| 2003/0236993 A1 | 12/2003 | McCreight et al. | |
| 2004/0039921 A1 | 2/2004 | Chuang | |
| 2004/0133672 A1 | 7/2004 | Bhattacharya et al. | |
| 2005/0132225 A1 | 6/2005 | Gearhart | |
| 2005/0138413 A1 | 6/2005 | Lippmann et al. | |
| 2005/0165834 A1 | 7/2005 | Nadeau et al. | |
| 2005/0193173 A1 | 9/2005 | Ring et al. | |
| 2005/0193430 A1 | 9/2005 | Cohen et al. | |
| 2005/0203921 A1 | 9/2005 | Newman et al. | |
| 2006/0037076 A1 | 2/2006 | Roy | |
| 2006/0104288 A1 | 5/2006 | Yim et al. | |
| 2006/0109793 A1 | 5/2006 | Kim et al. | |
| 2006/0167855 A1 | 7/2006 | Ishikawa et al. | |
| 2006/0191010 A1 | 8/2006 | Benjamin | |
| 2006/0248525 A1 | 11/2006 | Hopkins | |
| 2006/0253906 A1 | 11/2006 | Rubin et al. | |
| 2006/0271345 A1 | 11/2006 | Kasuya | |
| 2007/0055766 A1 | 3/2007 | Petropoulakis et al. | |
| 2007/0112714 A1 | 5/2007 | Fairweather | |
| 2007/0143852 A1 | 6/2007 | Keanini et al. | |
| 2007/0192863 A1 | 8/2007 | Kapoor et al. | |
| 2008/0010225 A1 | 1/2008 | Gonsalves et al. | |
| 2008/0167920 A1 | 7/2008 | Schmidt et al. | |
| 2008/0183520 A1 | 7/2008 | Cutts et al. | |
| 2008/0222734 A1 | 9/2008 | Redlich et al. | |
| 2009/0007270 A1 | 1/2009 | Futoransky et al. | |
| 2009/0113201 A1* | 4/2009 | Mackey | H04L 9/00 713/161 |
| 2009/0144827 A1 | 6/2009 | Peinado et al. | |
| 2009/0150998 A1 | 6/2009 | Adelstein et al. | |
| 2009/0158430 A1 | 6/2009 | Borders | |
| 2009/0164522 A1 | 6/2009 | Fahey | |
| 2009/0208910 A1 | 8/2009 | Brueckner et al. | |
| 2009/0254572 A1 | 10/2009 | Redlich et al. | |
| 2009/0288164 A1 | 11/2009 | Adelstein et al. | |
| 2009/0319247 A1 | 12/2009 | Ratcliffe et al. | |
| 2009/0319249 A1 | 12/2009 | White et al. | |
| 2009/0319647 A1 | 12/2009 | White et al. | |
| 2009/0319906 A1 | 12/2009 | White et al. | |
| 2009/0320137 A1 | 12/2009 | White et al. | |
| 2009/0328033 A1 | 12/2009 | Kohavi et al. | |
| 2010/0010968 A1 | 1/2010 | Redlich et al. | |
| 2010/0058114 A1 | 3/2010 | Perkins et al. | |
| 2010/0082513 A1 | 4/2010 | Liu | |
| 2010/0138925 A1 | 6/2010 | Barai et al. | |
| 2010/0146615 A1 | 6/2010 | Locasto et al. | |
| 2010/0284282 A1 | 11/2010 | Golic | |
| 2010/0319069 A1 | 12/2010 | Granstedt et al. | |
| 2011/0154471 A1 | 6/2011 | Anderson et al. | |
| 2011/0177480 A1 | 7/2011 | Menon et al. | |

(56) References Cited

U.S. PATENT DOCUMENTS

| | | |
|---|---|---|
| 2011/0282715 A1 | 11/2011 | Nguyen et al. |
| 2012/0198513 A1 | 8/2012 | Maida-Smith et al. |
| 2012/0210017 A1 | 8/2012 | Muhunthan et al. |
| 2012/0210427 A1 | 8/2012 | Bronner et al. |
| 2012/0258437 A1 | 10/2012 | Sadeh-Koniecpol et al. |
| 2013/0014264 A1 | 1/2013 | Kennedy et al. |
| 2013/0019312 A1 | 1/2013 | Bell et al. |
| 2013/0055404 A1 | 2/2013 | Khalili |
| 2013/0191919 A1 | 7/2013 | Basavapatna et al. |
| 2013/0273514 A1 | 10/2013 | Tambe et al. |
| 2013/0347085 A1 | 12/2013 | Hawthorn et al. |
| 2013/0347104 A1 | 12/2013 | Raber et al. |
| 2013/0347116 A1 | 12/2013 | Flores et al. |
| 2014/0046645 A1 | 2/2014 | White et al. |
| 2014/0099622 A1 | 4/2014 | Arnold et al. |
| 2014/0137257 A1 | 5/2014 | Martinez et al. |
| 2014/0165138 A1 | 6/2014 | Maida-Smith et al. |
| 2014/0287383 A1 | 9/2014 | Willingham et al. |
| 2014/0321735 A1 | 10/2014 | Zhang et al. |
| 2014/0337971 A1 | 11/2014 | Casassa Mont et al. |
| 2015/0033346 A1 | 1/2015 | Hebert et al. |
| 2015/0050623 A1 | 2/2015 | Falash et al. |
| 2015/0106324 A1 | 4/2015 | Puri et al. |
| 2015/0163088 A1 | 6/2015 | Anschutz |
| 2015/0193695 A1 | 7/2015 | Cruz Mota et al. |
| 2015/0213260 A1 | 7/2015 | Park |
| 2015/0213730 A1 | 7/2015 | Brueckner et al. |
| 2015/0269383 A1 | 9/2015 | Lang et al. |
| 2015/0339477 A1 | 11/2015 | Abrams et al. |
| 2016/0028764 A1 | 1/2016 | Vasseur et al. |
| 2016/0094578 A1* | 3/2016 | McQuillan ......... H04L 63/1466 726/23 |
| 2016/0099953 A1 | 4/2016 | Hebert et al. |
| 2016/0173495 A1 | 6/2016 | Joo |
| 2016/0188814 A1 | 6/2016 | Raghavan et al. |
| 2016/0205122 A1 | 7/2016 | Bassett |
| 2016/0219024 A1 | 7/2016 | Verzun et al. |
| 2016/0234242 A1 | 8/2016 | Knapp et al. |
| 2016/0246662 A1 | 8/2016 | Meng et al. |
| 2016/0285907 A1 | 9/2016 | Nguyen et al. |
| 2016/0307199 A1 | 10/2016 | Patel et al. |
| 2016/0330228 A1 | 11/2016 | Knapp et al. |
| 2016/0337400 A1 | 11/2016 | Gupta |
| 2017/0006055 A1 | 1/2017 | Strom et al. |
| 2017/0032694 A1 | 2/2017 | Brueckner et al. |
| 2017/0032695 A1 | 2/2017 | Brueckner et al. |
| 2017/0104778 A1 | 4/2017 | Shabtai et al. |
| 2017/0171230 A1 | 6/2017 | Leiderfarb et al. |
| 2017/0251010 A1 | 8/2017 | Irimie et al. |
| 2018/0048534 A1 | 2/2018 | Banga et al. |
| 2018/0068244 A1 | 3/2018 | Vashistha |
| 2018/0121657 A1 | 5/2018 | Hay et al. |
| 2018/0124108 A1 | 5/2018 | Irimie et al. |
| 2018/0129805 A1 | 5/2018 | Samuel |
| 2018/0139181 A1 | 5/2018 | Weinberger et al. |
| 2018/0150554 A1 | 5/2018 | Le et al. |
| 2018/0159894 A1 | 6/2018 | Reddy et al. |
| 2018/0191763 A1 | 7/2018 | Hillard et al. |
| 2018/0191770 A1 | 7/2018 | Nachenberg et al. |
| 2018/0219887 A1 | 8/2018 | Luo et al. |
| 2018/0225471 A1 | 8/2018 | Goyal et al. |
| 2018/0295154 A1 | 10/2018 | Crabtree et al. |
| 2018/0330253 A1 | 11/2018 | Gottschlich et al. |
| 2018/0367563 A1* | 12/2018 | Pfleger de Aguiar .. H04L 41/12 |
| 2018/0375892 A1 | 12/2018 | Ganor |
| 2019/0014153 A1 | 1/2019 | Lang et al. |
| 2019/0034623 A1 | 1/2019 | Lowry et al. |
| 2019/0083876 A1 | 3/2019 | Morton et al. |
| 2019/0102564 A1 | 4/2019 | Li et al. |
| 2019/0164015 A1 | 5/2019 | Jones et al. |
| 2019/0171822 A1 | 6/2019 | Sjouwerman et al. |
| 2019/0182273 A1 | 6/2019 | Walsh et al. |
| 2019/0188615 A1 | 6/2019 | Liu |
| 2019/0222593 A1 | 7/2019 | Craig et al. |
| 2019/0238583 A1 | 8/2019 | Vaidya |
| 2019/0258953 A1 | 8/2019 | Lang et al. |
| 2019/0260785 A1* | 8/2019 | Jenkinson ............... G06F 40/40 |
| 2019/0289029 A1 | 9/2019 | Chawla et al. |
| 2019/0312890 A1 | 10/2019 | Perilli |
| 2019/0356684 A1 | 11/2019 | Sinha et al. |
| 2019/0370473 A1 | 12/2019 | Matrosov et al. |
| 2019/0379705 A1 | 12/2019 | Murphy et al. |
| 2020/0050770 A1 | 2/2020 | Inagaki et al. |
| 2020/0145816 A1* | 5/2020 | Morin ................. H04L 63/1433 |
| 2020/0177617 A1 | 6/2020 | Hadar et al. |
| 2020/0184053 A1 | 6/2020 | Kursun |
| 2020/0184847 A1 | 6/2020 | Gabay et al. |
| 2020/0201992 A1 | 6/2020 | Hadar et al. |
| 2020/0233955 A1 | 7/2020 | Ramzan et al. |
| 2020/0358803 A1* | 11/2020 | Roelofs ............... H04L 63/1416 |
| 2021/0168170 A1 | 6/2021 | Asai et al. |
| 2021/0203682 A1 | 7/2021 | Bajpai |
| 2021/0344703 A1* | 11/2021 | Barajas ............... G06F 16/2379 |

FOREIGN PATENT DOCUMENTS

| | | |
|---|---|---|
| WO | WO-02/071192 A2 | 9/2002 |
| WO | WO-2017/105383 A1 | 6/2017 |

OTHER PUBLICATIONS

"Cyberspace Operations", U.S. Air Force, Air Force Policy Directive 10-17, Jul. 31, 2012, retrieved from URL: https://fas.org/irp/doddir/usaf/afpd10-17.pdf (9 pages).

"CYDEST: CYber DEfense Simulation Trainer", Air Force SBIR/STTR Award Details, Phase I, Award Details Status: Completed (Invited for Phase II) Start: Apr. 13, 2005 End Jan. 13, 2006, retrieved on Aug. 30, 2020 from URL: http://www.itfsbirsttr.com/award/AWARDDetails.aspx?pk=12036 (2 pages).

"Identification and Significance of the Problem or Opportunity", Architecture Technology Corporation, Proposal No. F172-D12-0184, Topic No. OSD172-D12, 10 pages (undated).

2015 DFRWS Forensics Challenge, "Submitted Solutions and Source Code Released", GPU Malware Research, retrieved on Mar. 22, 2020 from http://www.cs.uno.edu/-golden/gpumalware-research.html, 5 pages.

Architecture Technology Corporation et al.", Cydest (Cyber Defense Simulation Trainer)," http://web.archive.org/web/20061107010247/www.atcorp.com/securesystems/cydest.html, Dec. 2005, 1 page.

ATC-NY et al.,"Cyber Defense Simulation Trainer (CYDEST)", CYDEST Congressional Briefing, Feb. 19, 2007, 1 page.

ATC-NY, OSD172-D11, F172-D11-0024, Phase I SBIR Proposal, "SilverlineRT", Jul. 20, 2017, 16 pages.

ATC-NY, SB172-007, D172-007-0014, Phase I SBIR Proposal, Silverline Human Performance Detection (Silverline-HPD), Jul. 20, 2017 (17 pages).

Atighetchi et al., "Metrinome-Continuous Monitoring and Security Validation of Distributed Systems", Journal of Cyber Security and Information Systems vol. II, No. 1, Knowledge Management, Mar. 2014, pp. 20-26.

Baloch et al., "Comparative Study of Risk Management in Centralized and Distributed Software Development Environment", Sci. Int. (Lahore), vol. 26, No. 4, 2014, pp. 1523-1528.

Balzarotti et al., "The Impact of GPU-Assisted Malware on Memory Forensics: A Case Study", DFRWS 2015, Elsevier, Digital Investigation, vol. 14, 2015, pp. S16-S24.

Becker et al., "Applying Game Theory to Analyze Attacks and Defenses in Virtual Coordinate Systems," 41st International Conference on Dependable Systems & Networks (DSN), Jun. 2011, pp. 133-142.

Bergstromb et al., "The Distributed Open Network Emulator: Using Relativistic Time for Distributed Scalable Simulation", Proceedings of the 20th Workshop on Principles of Advanced and Distributed Simulation, May 23-26, 2006, 7 pages.

Brueckner et al., "CYDEST Cyber Defense Simulation Trainer", ATC-NY a subsidiary of Architecture Technology Corporation, Oct. 29, 2007, 20 pages.

(56) References Cited

OTHER PUBLICATIONS

C.M.U. Entertainment Technology Center, "CyberSecurity", found at http://www.etc.cmu.edu/projects/cybersecurity/, Feb. 2000, 16 pages.
Carson et al., "NIST NET: A Linux-based network emulation tool" ACM SIGCOMM, Computer Communication Review, vol. 33, Issue 3, Jul. 2003, 16 pages.
Carver et al., "Military Academy Attack/Defense Network", IEEE Systems, Man, and Cybernetics Information Assurance and Security Workshop, West Point, NY, Jun. 17-19, 2002, 6 pages.
Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.
Crumb, Francis L., "Cyber Security Boot Camp graduates Class of '06", Academy Spirit, vol. 46, No. 33, Aug. 18, 2006, U.S. Air Force Academy, Colorado (1 page).
Davoli, "Virtual Square: all the virtuality you always wanted but you were afraid to ask," http://virtualsguare.org/copyright Renzo Davoli, May 27, 2004, 3 pages.
Davoli, "Virtual Square", Proceedings of the First International Conference on Open Source Systems, Genova, Jul. 11-15, 2005, 6 pages.
De Gusmao et al., "Abstract of Cybersecurity risk analysis model using fault tree analysis and fuzzy decision theory", 2018, International Journal of Information Management, pp. 1-3.
Duggirala et al., "Open Network Emulator", Jan. 15, 2005, available at URL: https://web.archive.org/web/2010*/http://csrl.cs.vt.edu/net_emulation.html (5 pages).
Edwards et al., "Hajime: Analysis of a decentralized internet worm for IoT devices", RapidityNetworks, Security Research Group, Oct. 16, 2016, pp. 1-18.
Fisher, "Developing Software in a Multicore & Multiprocessor World," Klocwork White Paper, Klocwork.com., Sep. 2010, pp. 1-11.
Home Invasion 2.0, "Attacking Network-Connected Embedded Devices", retrieved from the internet on Jun. 20, 2018, https://media.blackhat.com/us-13/US-13-Crowley-Home-Invasion-2-0-WP.pdf, 15 pages.
Honeynet Project, "Know Your Enemy: Defining Virtual Honeynets," http://old.honeynel.org/papers.virtual/, Jan. 27, 2003, 7 pages.
Howard et al., "A Common Language for Computer Security Incidents," Sandia National Laboratories Report, SAND9B 8667, Oct. 1998, 32 pages.
Ingoldsby, T. "Attack Tree-based Threat Risk Analysis" (2010) Amenaza Technologies Limited (2010): 3-9 (62 pages).
Jones, "Software Defect Origins and Removal Methods," International Function Point Users Group, Capers Jones, Dec. 28, 2012, pp. 1-31.
Joyce et al., "MEGA: A Tool for Mac OS X Operating System and Application Forensics," Digital Investigation, vol. 5, Elsevier, Proceedings of the Digital Forensic Research Conference, Aug. 11-13, 2008, pp. 583-590.
Joyce, "TrestleHSM: Hierarchical Security Modeling for Naval Control Systems", Phase 1 SBIR Proposal, Topic: N181-051, Unified Cybersecurity System Modeling of Naval Control Systems, Architecture Technology Corporation, 25 pages.
Keshav, "REAL: A Network Simulator," Computer Science Division, Department of Electrical Engineering and Computer Science, University of California, Berkeley, Dec. 1988, 16 pages.
Kimball, "Silverline Human Performance Detection (Silverline-HPD)", Phase 1 SBIR Proposal, Architecture Technology Corporation, SB172-007, D172-007-0014, Jul. 20, 2017, 17 pages.
Krishna et al., "V-Netlab: A Cost-Effective Platform to Support Course Projects in Computer Security", Department of Computer Science, Stony Brook University, Jun. 2005, 7 pages.
Lathrop et al., "Information Warfare in the Trenches: Experiences from the Firing Range," U.S. Military Academy, Security education and critical infrastructures, Kluwer Academic Publishers Norwell, MA, USA .copyright, Jun. 23-26, 2003, 21 pages.

Lathrop et al., "Modeling Network Attacks", 12th Conference on Behavior Representation in Modeling and Simulation, 2003, pp. 401-407 (8 pages).
Li, et al., "Unified threat model for analyzing and evaluating software threats," Security and Communication Networks; vol. 7; Jul. 5, 2012; pp. 1454-1466.
Libicki, "Cyberdeterrence and Cyberwar," Rand Corporation, Project Air Force, 2009, 240 pages.
Liljenstam et al., "RINSE: The Real-Time Immersive Network Simulation Environment for Network Security Exercises", Proceedings of the 19th Workshop on Principles of Advanced and Distributed Simulation (PADS), Jun. 2005, 10 pages.
Maciel, et al. "Impact of a DDoS Attack on Computer Systems: An approach based on an Attack Tree Model," 2018 Annual IEEE International Systems Conference (SysCon), Vancouver, BC, 2018, pp. 1-8.
McDonald, Chris, "A Network Specification Language and Execution Environment for Undergraduate Teaching", ACM SIGCSE Bulletin, vol. 23, Issue 1, Mar. 1991, DOI: 10.1145/107005.107012 (10 pages).
McGrath et al., "NetSim: A Distributed Network Simulation to Support Cyber Exercises", Institute for Security Technology Studies, Dartmouth College, Huntsville Simulation Conference, Mar. 9-11, 2004, Huntsville, Alabama, 6 pages.
Mchale, "The Aegis Combat System's continuous modernization", Military Embedded Systems, Retrieved on Mar. 22, 2020 from http://mil-Embedded.com/articles/the-aegis-combat-systems-continuous-modernization/, 8 pages.
McLinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12, 1 page (undated).
Padman et al., "Design of a Virtual Laboratory for Information Assurance Education and Research", Proceedings of the 2002 IEEE, Workshop on Information Assurance and Security, U.S. Military Academy, West Point, Jun. 2002, 7 pages.
Porche III et al., "A Cyberworm that Knows no Boundaries", RAND Corporation, National Defense Research Institute, 2011, 55 pages.
PR Newswire, "ATCorp Releases CSAS-Cloud Security Analysis Suite for Applications in the Cloud", Architecture Technology Corporation, Feb. 26, 2016, 4 pages.
Proposal Author: Matthew Donovan; Topic Name and No. N182-131: Red Team in a Box for Embedded and Non-IP Devices; Title: Automated Cyber Evaluation System, Jun. 30, 2018, 24 pages.
Quinlan et al., "ROSE User Manual: A Tool for Building Source-to-Source Translators", Draft User Manual, Version 0.9.11.115, Lawrence Livermore National Laboratory, Sep. 12, 2019 (337 pages).
Quinlan et al., "ROSE User Manual: A Tool for Building Source-to-Source Translators", Draft User Manual, Version D.9.6a, Lawrence Livermore National Laboratory, Dec. 16, 2015 (169 pages).
Rahman et al., "Defect Management Life Cycle Process for Software Quality Improvement," World Academy of Science, Engineering and Technology International Journal of Computer and Information Engineering, vol. 9, No. 12, 2015 3rd International Conference on Artificial Intelligence, Modelling and Simulation, Nov. 24, 2015, pp. 241-244.
Richard III, "Memory Analysis, Meet GPU Malware", University of New Orleans, CERIAS, Oct. 22, 2014, retrieved from URL: http://www.cerias.purdue.edu/news_and_events/events/security_seminar/details/index/popenihmencsf2v5mggg5ulfd4 (2 pages).
Richard III, Golden G., "Memory Analysis, Meet GPU Malware", CERIAS, Oct. 22, 2014, retrieved 2021 from URL: https://www.cerias.purdue.edu/news_and_events/events/security_seminar/details/index/popenihmencsf2v5mggg5ulfd4 (3 pages).
Robbio, "How Will AI Impact Software Development?", Forbes Technology Council, Aug. 31, 2017, retrieved on Mar. 23, 2020 from https://www.forbes.com/sites/forbestechcouncil/2017/08/31/how-will-ai-impact-software-development/#325be7e7264d, 16 pages.
Rose: Main Page, Lawrence Livermore National Laboratory, retrieved on Mar. 23, 2020 from http://rosecompiler.org/ROSE_HTML_Reference/, 3 pages.

(56) References Cited

OTHER PUBLICATIONS

Saic et al., "TeamDefend, A White Paper on Strengthening the Weakest Link: Organizational Cyber Defense Training", 17th Annual First Conference, Jun. 26-Jul. 1, 2005, 6 pages.

Saunders, "Simulation Approaches in Information Security Education", Proceedings of the Sixth National Colloquium for Information Systems Security Education, Redmond, Washington, Jun. 4-6, 2002, 15 pages.

Schafer et al., "The IWAR Range: A Laboratory for Undergraduate Information Assurance Education", Military Academy West Point, NY, Research paper, found at http://handle.dtic.mil/100.2/ADM08301, Nov. 7, 2000, 7 pages.

Schepens et al., "The Cyber Defense Exercise: An Evaluation of the Effectiveness of Information Assurance Education", 2003, 14 pages.

Schneier, B., "Attack Trees—Schneier on Security", Dr. Dobb's Journal, Dec. 1999, retrieved Mar. 23, 2020 from URL: https://www.schneier.com/academic/archives/1999/12/attack_trees.html (9 pages).

Shiva et al., "Game Theory for Cyber Security," Proceedings of the Sixth Annual Workshop on Cyber Security and Information Intelligence Research, Article No. 34, Apr. 2010, 10 pages.

Sirianni, "A19-080 Cyber Security Tool Kits For Engineers and Soldiers," Phase 1 SBIR Proposal, Architecture Technology Corporation, 24 pages (undated).

Sironi et al., "Metronome: Operating System Level Performance Management via Self-Adaptive Computing", DAC 2012, Jun. 3-7, 2012, pp. 856-865.

Snyder et al., "Ensuring U.S. Air Force Operations During Cyber Attacks Against Combat Support Systems—Guidance for Where to Focus Mitigation Efforts," RAND Corporation, 2015, 37 pages.

Stumpf et al., "NoSE-building virtual honeynets made easy", Darmstadt University of Technology, Department of Computer Science, D-64289 Darmstadt, Germany, 2005, 11 pages.

Stytz et al., "Realistic and Affordable Cyberware Opponents for the Information Warfare BattleSpace," Jun. 2003, 42 pages.

Varga, "The OMNeT ++ Discrete Event Simulation System", Department of Telecommunications, Budapest University of Technology and Economics, Proceedings of the European Simulation Multiconference, Jun. 2001, 7 pages.

Vasiliadis et al., "GPU-Assisted Malware", 2010 5th International Conference on Malicious and Unwanted Software, 2010, pp. 1-6.

Vrable et al., "Scalability, Fidelity, and Containment in the Potemkin Virtual Honeyfarm," SOSP, Oct. 23-26, 2005, 15 pages.

Wang et al., "The design and implementation of the NCTUns 1.0 network simulator", Computer Networks, vol. 42, Issue 2, Jun. 2003, 23 pages.

White et al., "Cyber Security Exercises: Testing an Organization's Ability to Prevent, Detect and Respond to Cyber Security Events," Proceeding of the 37th Hawaii International Conference on System Sciences, Jan. 2004, 10 pages.

Wikipedia-OpenCL, Mar. 29, 2017, Retrieved from https://en.wikipedia.org/wiki/OpenCL, 23 pages.

Wu et al., "An Attack Modeling Based on Hierarchical Colored Petri Nets", 2008 International Conference on Computer and Electrical Engineering, Phuket, 2008, pp. 918-921.

Xie et al., "Security Analysis on Cyber-Physical System Using Attack Tree", 2013 Ninth International Conference on Intelligent Information Hiding and Multimedia Signal Processing, IEEE Computer Society, IEEE, 2013, pp. 429-432, DOI: 10.1109/IIH-MSP.2013.113 (4 pages).

Xu et al., "A Minimum Defense Cost Calculation Method for Cyber Physical System", 2019 Seventh International Conference on Advanced Cloud and Big Data (CBD), IEEE, 2019, pp. 192-197, DOI: 10.1109/CBD.2019.00043 (6 pages).

Xu et al., "Attack Identification for Software-Defined networking based on attack trees and extension innovation methods," 2017 9th IEEE Intl. Conf. on Intelligent Data Acquisition and Advanced Computing Systems: Technology and Applications (IDAACS), Bucharest, 2017, pp. 485-489.

Zeng et al., "GloMoSim: A Library for Parallel Simulation of Large-scale Wireless Networks" ACM SIGSIM Simulation Digest, vol. 28, Issue 1, Jul. 1998, 8 pages.

Haque, Md Shariful, and Travis Atkison. "An evolutionary approach of attack graph to attack tree conversion." International Journal of Computer Network and Information Security 11.11 (2017): 1. (Year: 2017).

Homer, John, et al. "Aggregating vulnerability metrics in enterprise networks using attack graphs." Journal of Computer Security 21.4 (2013): 561-597. (Year: 2013).

Machine Translation of CN108780480 (Year: 2018).

* cited by examiner

AUTOMATED SECURITY COMPLIANCE FOR SYSTEM NODES

CROSS-REFERENCE TO RELATED APPLICATIONS

This application is a continuation of U.S. patent application Ser. No. 16/741,953, entitled "Systems and Methods for Continuous Compliance of Nodes," filed Jan. 14, 2020, which is incorporated by reference in its entirety.

This application generally relates to U.S. patent application Ser. No. 16/012,651, filed Jun. 19, 2018, titled "Systems and Methods for Improving the Ranking and Prioritization of Attack-Related Events," and U.S. patent application Ser. No. 16/267,304, filed Feb. 4, 2019, titled "Systems and Methods for Unified Hierarchical Cybersecurity," each of which is incorporated by reference in its entirety.

TECHNICAL FIELD

This application relates generally to methods and systems for continuous compliance of nodes in one or more systems.

BACKGROUND

High-value military and civilian information technology (IT) systems face constant attacks. The impact of a significant compromise can be catastrophic. In the context of military systems that support air and missile defense (AMD) and position, navigation, and timing (PNT) initiatives, effective weapon cueing, especially real-time AMD cueing is a force multiplier. Degradation in the PNT and information integrity may result in poor cueing that degrades AMD sensor and weapon performance. Such degradation may lead to fratricide and loss of protected assets. In addition, effective sensor cues that have been infected via cyber-attack may become infective and become deterrents of the overall AMD system performance. Bad cues may be more damaging than no cues because the administrative user may perceive the system to be performing as expected.

Furthermore, keeping a system compliant with secure configurations proves to be difficult throughout the lifetime of the system devices after updates, patches, and daily usage. Failing to do so may increase the attack surfaces by which adversaries can infiltrate a system. The attack surface of an environment is the sum of the different points (the "attack vectors") where an unauthorized user (the "attacker") can enter data to or extract data from the environment. Networked system may provide an avenue for an adversary to infiltrate a machine to view, modify, and destroy information and functionality of devices. Adversaries may leverage compromised systems to employ intelligence exploitation and manipulate users' situational understanding, which may cause users to act counter to operational needs. Weapon systems may have a wide variety of components, each with unique ways in which their functionality could be exploited to affect operational needs. As a result, it may be difficult to create a solution that is applicable to different systems.

Conventional methods for cyber defense may have a set of shortcomings. For example, conventional methods for cyber defense may require manual operations for continuous maintenance of systems throughout the lifecycle. For example, users may need to manually monitor the systems and keep the systems updated and patched to address known vulnerabilities and prevent the vulnerabilities from being exploited by adversaries in the future. However, users may not have the expertise to maintain the security configurations. Users may also be unable to make effective system assessment and incident response decisions.

As a result, conventional methods for cybersecurity may be incomplete, ineffective, and time consuming for requiring manual operations. Additional tools are needed for more coordinated and effective decision-making and accountability. Users may need tools that can automate system assessment and responses or give guidance to facilitate the rules and policies of systems.

What is needed are tools that enable the capability to effectively maintain system security, inform users of compromised systems in real-time, and mitigate the effects of cyber-attacks automatically. What is further needed is system specific methods with hardening and monitoring implementations to account for vulnerabilities unique to one or more specific systems. The system-specific methods may defend each component to prevent adversaries from gaining a foothold which may be leveraged for lateral movement to further compromise more essential system components.

SUMMARY

What is therefore desired is to have a system that develops an automated security compliance, monitoring, and feedback toolset that hardens a system during setup and continues to scan and alert users of changes of system status as well as indicators of cyber-attacks. Embodiments disclosed herein describe an impact modeling tool or a security application that provides the means for system administrators to rapidly configure system devices and keep them compliant with cybersecurity policies while in use. The embodiments disclosed herein are applicable to military and civilian infrastructure and commercial enterprise networks.

Specifically, an analytic server running the security application may automate the process of keeping system nodes continuously compliant with secure configurations without user assistance, which may save time and yield greater security through repeatable analysis of systems. The analytic server may monitor a system and generate an attack tree model. The analytic server may detect one or more attacks (e.g., malicious behaviors) using the attack tree model and calculate an impact score of currently perceived issues that may impact system operations and alert users of such issues and malicious behaviors. In some embodiments, the analytic server may automatically respond to one or more attacks by taking automated actions to mitigate system impact of the attacks. If subsequent reactive measures were unsuccessful, the analytic server may alert the user that the system can no longer be trusted.

In one embodiment, a computer-implemented method comprises monitoring, by a server, a distributed system by retrieving status information from a plurality of devices within the distributed system; generating, by the server, an attack tree model for the distributed system based on a set of aggregation rules, wherein the attack tree model comprises one or more parent nodes and one or more child nodes, wherein the set of aggregation rules are configured based on the status information of the plurality of devices, and determine lower-level operating conditions of an attack for the child nodes and higher-level operating conditions of the attack for the parent nodes in the attack tree model; detecting, by the server, one or more attacks on the distributed system by associating the status information with corresponding nodes of the attack tree model and executing a logic of the attack tree model, wherein executing the logic of the attack tree model comprises traversing the attack tree model from the one or more child nodes to respective parent nodes and determining aggregated impact and risk metrics based on the status information; determining, by the server, an impact score for each of the one or more attacks based on the aggregated impact and risk metrics; generating, by the server, a graphical user interface comprising a list of the one or more attacks ranked based on the impact scores, wherein the graphical user interface is dynamically updated in response to the server continuously retrieving new status information; and upon the impact scores of one or more highly ranked attacks satisfying a threshold, responding, by the server, to the one or more highly ranked attacks by taking automated actions that reconfigure devices associated with the one or more highly ranked attacks based on system configuration policies.

In another embodiment, a system comprises a plurality of devices within a distributed system; a server in communication with the plurality of devices and configured to: monitor the distributed system by retrieving status information from the plurality of devices within the distributed system; generate an attack tree model for the distributed system based on a set of aggregation rules, wherein the attack tree model comprises one or more parent nodes and one or more child nodes, wherein the set of aggregation rules are configured based on the status information of the plurality of devices, and determine lower-level operating conditions of an attack for the child nodes and higher-level operating conditions of the attack for the parent nodes in the attack tree model; detect one or more attacks on the distributed system by associating the status information with corresponding nodes of the attack tree model and executing a logic of the attack tree model, wherein executing the logic of the attack tree model comprises traversing the attack tree model from the one or more child nodes to respective parent nodes and determining aggregated impact and risk metrics based on the status information; determine an impact score for each of the one or more attacks based on the aggregated impact and risk metrics; generate a graphical user interface comprising a list of the one or more attacks ranked based on the impact scores, wherein the graphical user interface is dynamically updated in response to the server continuously retrieving new status information; and upon the impact scores of one or more highly ranked attacks satisfying a threshold, respond to the one or more highly ranked attacks by taking automated actions that reconfigure devices associated with the one or more highly ranked attacks based on system configuration policies.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
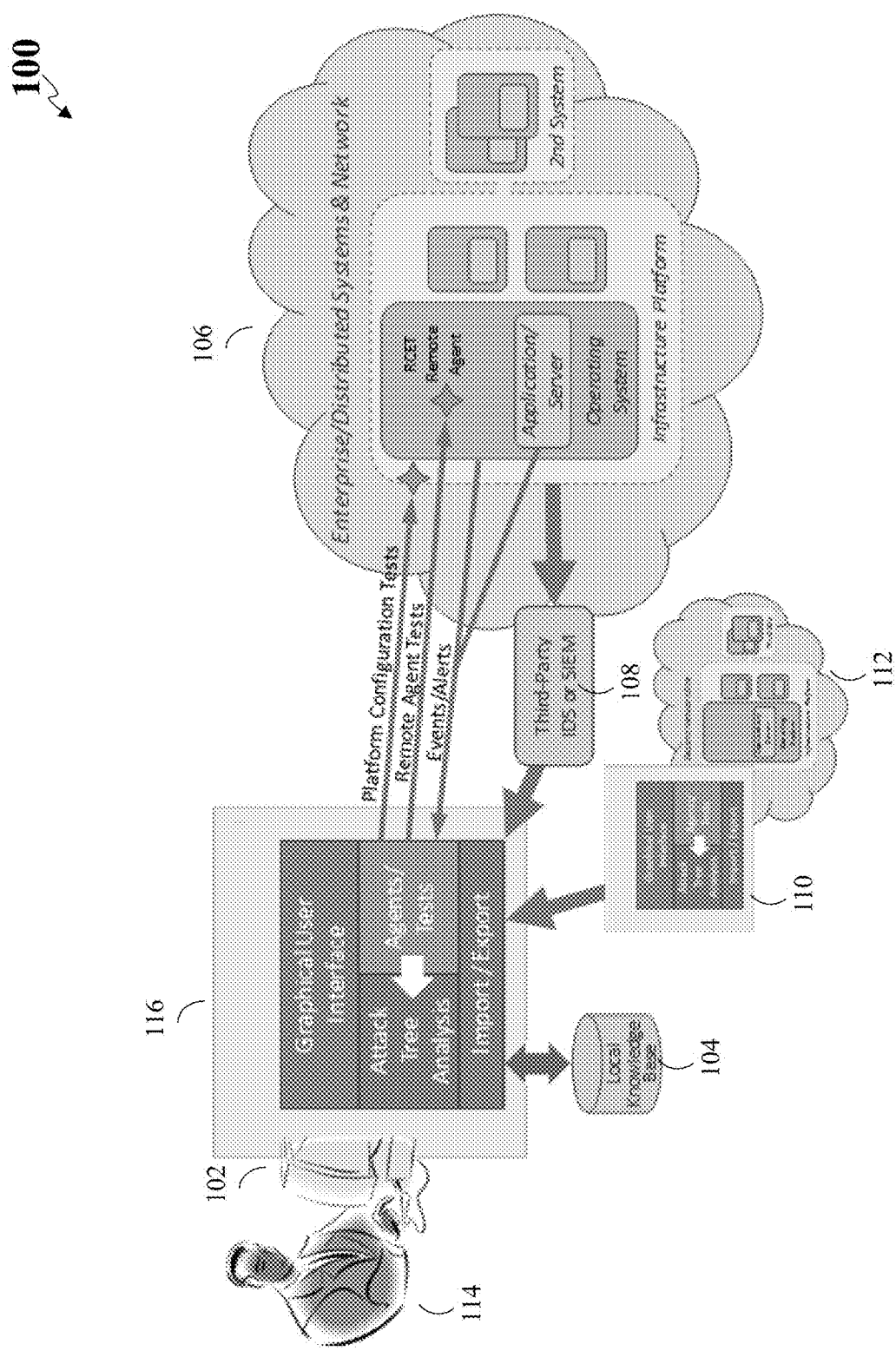
FIG. 1 illustrates a computer system for continuous compliance of nodes, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An analytic server running the security application may automate intrusion detection and prevention. The analytic server may monitor a distributed system by retrieving status information from various devices within the system. The analytic server may generate an attack tree model for the system based on a set of aggregation rules. The set of aggregation rules may be configured by a user based on the monitored status information. The analytic server may detect one or more attacks on the system by associating the status information with corresponding nodes of the attack tree model and executing a logic of the attack tree model. The analytic server may determine aggregated results (e.g., aggregated impact and risk metrics) in the process of executing the logic of the attack tree model and calculate an impact score for each attack based on aggregated impact and risk metrics. The analytic server may generate real-time reports comprising a list of the one or more attacks ranked based on the impact scores. The analytic server may automatically respond to one or more highly ranked attacks by taking automated actions to mitigate system impacts of the attacks upon the impact scores of the highly ranked attacks satisfying a threshold.

The embodiments disclosed herein describe an impact modeling tool or a security application that may harden a system, monitor changes to compliance, report potential impact, and automate recovery. Embodiments described herein build a system of continuous compliance of nodes, which may be a system hardening and monitoring software toolkit that reduces the attack surface available to adversaries and alerts administrative users of malicious behavior that could impact system operations. An analytic server running the security application may use impact models based on an enhanced version of attack trees, and generate sensible alerts based on changes that could affect the performance of system devices. The analytic server may also facilitate automated responses that are consistent with overall mission needs and priorities. As a result, the embodiments disclosed herein may automatically reduce the impacts of attackers on operations without user intervention.

The embodiments disclosed herein may automate the installation of secure configurations and continue to monitor the system in real-time to notify users of changes that indicate compromise by a cyber-attacker. For example, engineers who develop the hardware and software of systems may use the embodiments to rapidly develop securely configured machines/devices and maintain their health by keeping the systems within policy guidelines. Users of the systems may use the embodiments to be alerted of changes of the device status (e.g., sensor and weapon cyber status in military system) to determine if a system has been compromised. The embodiments disclosed herein may provide designing systems that minimize the likelihood of a successful cyber-attack and also provide real-time notification of an attempted cyber-attack.

Embodiments disclosed herein may provide tools to detect system compromise and provide a visual or aural indication of compromise. Such tools should be effective, supportable, and cannot be compromised. The tools may be signature based, behavior based, or may leverage any other techniques. The tools may require little to no training for user implementation and may be persistent "plug and forget devices." The tool implementations may be system specific, such as AMD sensor system specific and/or weapon system specific to ensure effective cues for users of such systems. The tools may be compatible with or tolerate periodic system software updates/patches and be supportable throughout the lifetime of systems. The tools may minimize the false positives while identifying and flagging the cyber infected cues in real-time without failing.

FIG. 1 illustrates components of a security system 100 for continuous compliance of nodes, according to an embodiment. The security system 100 may include an analytic server 102 with a local knowledge database 104, enterprise/distributed systems and network infrastructure 106, a third party intrusion detection system (IDS) or security information and event management (SIEM) system 108, a second analytic server 110 connected with a second network of distributed systems 112. FIG. 1 shows how the impact modeling tool or security application fits within a network enclave or standalone device as a real-time monitoring system. The analytic server and other system devices may be connected via hardware and software components of one or more networks. Examples of the network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The analytic server 102 comprising the impact modeling tool or the security application 116 may be any computing device comprising a processor and other computing hardware and software components, configured to build a security system containing one or more security applications. The analytic server 102 may be logically and physically organized within the same or different devices or structures, and may be distributed across any number of physical structures and locations (e.g., cabinets, rooms, buildings, cities).

The analytic server 102 may execute automated configuration and run-time status queries. At the same time, the analytic server 102 may receive logging and device status information from the servers, endpoints, and network devices under management. For example, the analytic server 102 may receive logging and device status information from the devices in the enterprise/distributed systems and network infrastructure 106, the second analytic server 110 connected with the second network of distributed systems 112. The analytic server 102 may also query existing IDS and SIEM systems for device status data, and receive such data asynchronously from the third party IDS or SIEM 108. The logging and device status information collected on each device may be collected via standard protocols such as syslog, secure shell (SSH), or the simple network management protocol (SNMP). The analytic server 102 may also incorporate alerts from existing monitoring tools. The OASIS® structured threat information expression (STIX) is a natural way of describing the logging and alert data and is supported in the security system 100 via the OASIS trusted automated exchange of intelligence information (TAXII) transport. In this way, the security system 100 may leverage future/third-party monitoring techniques.

The analytic server 102 may build a security application 116 for automated security compliance of system nodes. The security application 116 of the analytic server 102 may be capable of monitoring system devices over a network through secure protocols and aggregating the health status while reporting changes to the user in real-time. For standalone devices, the security application 116 may also be able to run through a terminal without the need for a graphical user interface (GUI). This mode may reduce the required resources and enable the security application 116 to run on minimal size-weight-and-power (SWAP) hardware, which can be deployed as a persistent "plug and forget" device. The security application 116 may alert users of status changes with a simple auditory and/or visual cue. The analytic server 102 may extract historical data from the external enterprise/distributed systems and network infrastructure 106 for further analysis. The analytic server 102 may also provide the ability for remote logging, which may keep the system safe from tampering in the case of compromise.

The analytic server 102 may build a security application 116 by using an attack tree model based on a set of aggregation rules, which dictate how various metrics are computed in terms of lower-level data. In the security application 116, the analytic server 102 may support a large set of aggregation functions, and the user (e.g., administrator, analyst) can define customized functions if needed. The analytic server 102 may refine the interface for aggregation functions and provide a set of aggregators specific to assessing real-time threat indicator data. The results of the aggregation rules can be in standard form such as national institute of standards and technology (NIST) common vulnerability scoring system (CVSS) vectors or costs, or in mission domain-specific terms. As data arrives, the metrics will be recomputed in real-time, "bubbling up" the tree as appropriate.

After the analytic server 102 prioritizes and analyzes the aggregated impacts of multiple alerts, IDS notifications, and other attack indicators, the analytic server 102 may display the results on a user interface of the analytic server or on a computing device (not shown) associated with the analyst 114. The analyst 114 may easily see which alerts have the most significant "big picture" impact and which can be triaged for later assessment by low-level personnel. When cost or other metrics are available within the model, the analyst 114 may see which proposed remediation strategies have the most significant impacts for the least cost or least mission disruption.

Figure 3:
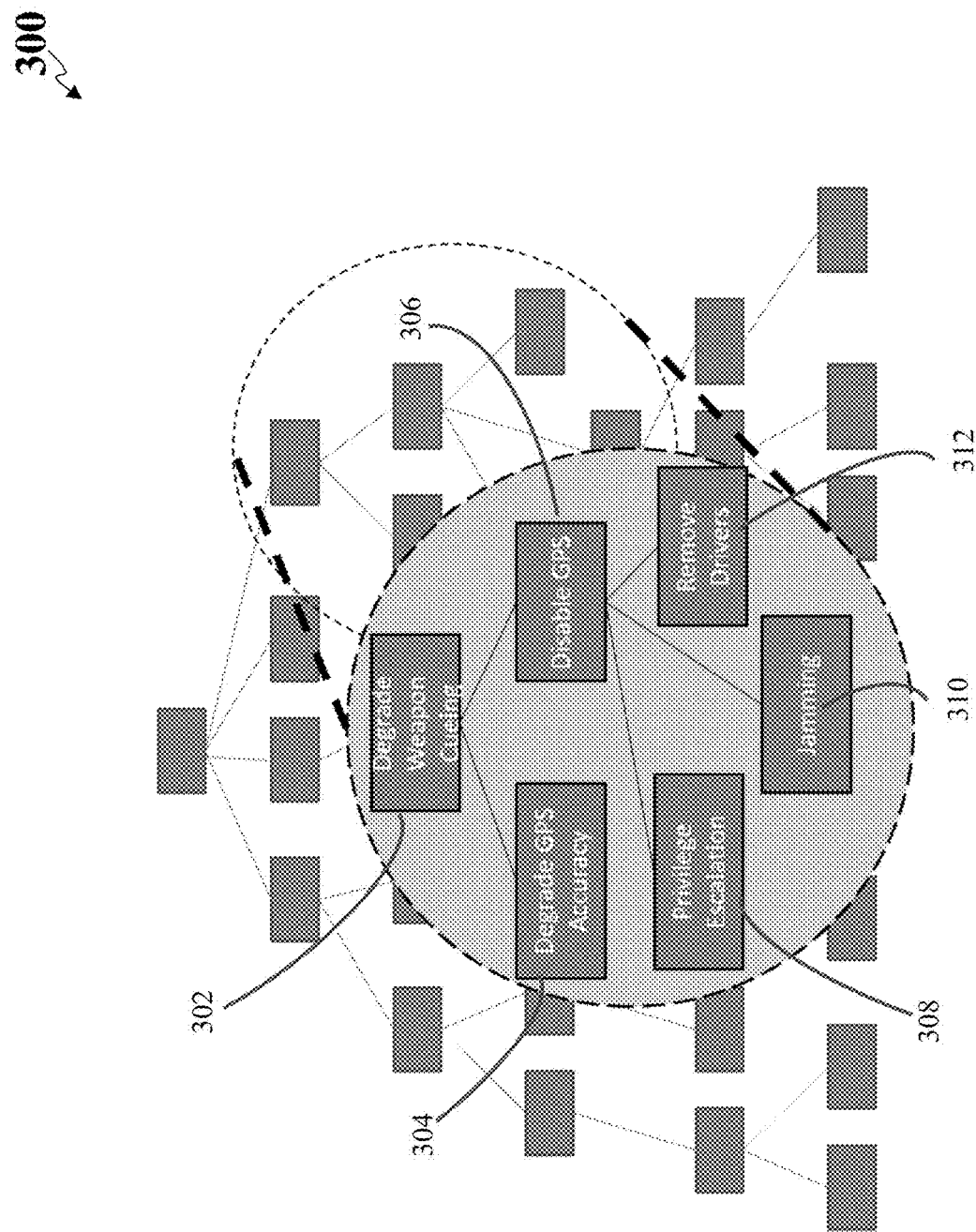
FIG. 3 illustrates an example of an attack tree model, according to an embodiment.

The analytic server 102 may provide a visualization component in the GUI that integrates tools modularly within a single interface to meet all the needs of administrators/analysts and other users. The analytic server 102 may model system risks using attack tree models, where are created to support systematic investigation of attack modalities in specific systems. For example, in the military weapon system, the attack tree model may invest the vulnerabilities and malware that can be exploited to degrade weapon cueing. FIG. 3 illustrates an attack tree for degrading weapon cueing in a military system, according to an embodiment.

The analytic server 102 may operate the security application 116 in a federal manner, where portions of the tree model located at various sites or administrative domains are maintained by local experts. At alternate sites, headless copies of security applications aggregate site-local data and alerts; the results may provide aggregated inputs to one or more "master" instances for analyst use. Such an architecture may allow for voluminous, potentially sensitive alert and IDS data to stay local (e.g., for forensic purposes) while enabling the entire system to scale up for large enterprises.

Furthermore, the analytic server 102 may use the security application 116 to help the analyst 114 sort out false alarms from true attacks that have minimal impacts on mission success, and highlight the attacks that may have to be addressed immediately and possibly automatically. Therefore, the analytic server 102 may save time and reduce cognitive burden on overloaded security analysts.

The security application 116 built by the analytic server 102 may include several components or modules, such as an import/export module, an attack tree analysis module, an agent tests module, a graphical user interface module. The import/export module may receive data from or transmit data to local knowledge database 104. The import/export module may also receive logging and device status information from devices under management, such as the servers, endpoints, and network devices in the distributed systems and network infrastructure 106 through a third-party IDS or SIEM 108. The agent tests module may receive events and alerts from the operating system of the infrastructure platform within the enterprise/distributed systems and network infrastructure 106 or applications and servers within the operating system. In addition, the agent tests module may perform configuration tests and remote agent tests on the operating system of the infrastructure platform within the enterprise/distributed systems and network infrastructure 106. The agent tests module may interact with the attack tree analysis module to determine and analyze the security attacks. The attack tree module may comprise a set of aggregation rules for computing various metrics on threats and possible attacks on different devices. The graphical user interface module may comprise graphical interactive elements configured to display analysis results and threat indicator data, receive user configuration, and any other interactive elements that allow the user to interact with the analytic server 102.

The local knowledge database 104 may be any non-transitory machine-readable media associated with the analytic server 102. The local knowledge database 104 may be configured to store data, including logging and device status information from different devices and systems, the attack tree model comprising aggregation rules and configurations for analyzing security threats and attacks, the metrics computed based on the aggregation rules in the attack tree model, the ranking and prioritization of attack-related events. The local knowledge database 104 may also include any other data that is helpful for analyzing security alerts and server/endpoint/network events.

The enterprise/distributed systems and network infrastructure 106 may be any number of devices and systems connected with each other within a distributed system. Such devices and systems may be under management of the analytic server 102. The enterprise/distributed systems and network infrastructure 106 may comprise infrastructure platform with operating system for servers and applications. The operating system may receive remote agent tests from the analytic server 102. The infrastructure platform of one system may be connected to another system (e.g., a second system). The infrastructure platform of each system may transmit logging and device status information to the analytic server 102 via a third-party IDS or SIEM 108.

The enterprise/distributed systems and network infrastructure 106 may be a unified system comprising a plurality of sub-systems. The analytic server 102 may manage the security of the unified system 106 based on an attack tree model. The analytic server 102 may build a high-level attack tree model of the unified system 106 by aggregating the sub attack trees of the sub-systems within the united system 106. Specifically, the analytic server may instantiate a sub attack tree for each sub-system within the distributed network infrastructure 106. The analytic server 102 may determine how the interconnection of the plurality of sub-systems may affect the unified system security. The analytic server 102 may build the attack tree based on a set of aggregation rules. Each sub-system may integrate sensing, computation, control and networking into physical objects/devices and infrastructures that are connected with each other.

The attack tree model of the unified system may make reference to sub attack trees of the plurality of sub-systems. The analytic server 102 may refer to the sub attack trees as files or via URL (Uniform Resource Locator) or URI (Uniform Resource Identifier). For example, when the analytic server 102 traverses the attack tree model of the unified system, the analytic server 102 may reach a portion of the attack tree model that is a reference to a sub attack tree of a sub-system. The reference may be a URL or URI. The analytic server 102 may access or refer to the sub attack tree based on the identifier (e.g., URL or URI) in runtime. The analytic server 102 may generate a machine-readable markup file of an attack tree to store the identifiers of the plurality of sub attack trees of the sub-systems.

Furthermore, the analytic server 102 may generate a set of parameters (e.g. parameterized references) based on security analysis from the traversing of the attack tree, while refer to the sub attack trees. When the analytic server 102 refers to the sub attack trees, the analytic server 102 may transmit the set of parameters to the sub attack trees. Sequentially, each sub attack tree may execute the logic for detecting attacks based on the set of parameters.

The third-party IDS or SIEM 108 may be any device or software application that monitors a network or systems for malicious activity or policy violations. The SIEM system may report any malicious activity or violation to an administrator or analyst. The SIEM may combine outputs from multiple sources. The third-party IDS or SIEM 108 may plug in the existing systems, aggregate the alerts and events from various systems and devices and import the alerts and events into the security application 116 running on the analytic server 102.

The second analytic server 110 connected with the second network of distributed systems 112 may be a similar system architecture as the analytic server 102 connected with the enterprise/distributed systems and network infrastructure 106. The different analytic servers may be in communication with each other and feed alerts and events information into each other. The system 100 may comprise any number of such analytic servers and connected networks of distributed systems.

Figure 2:
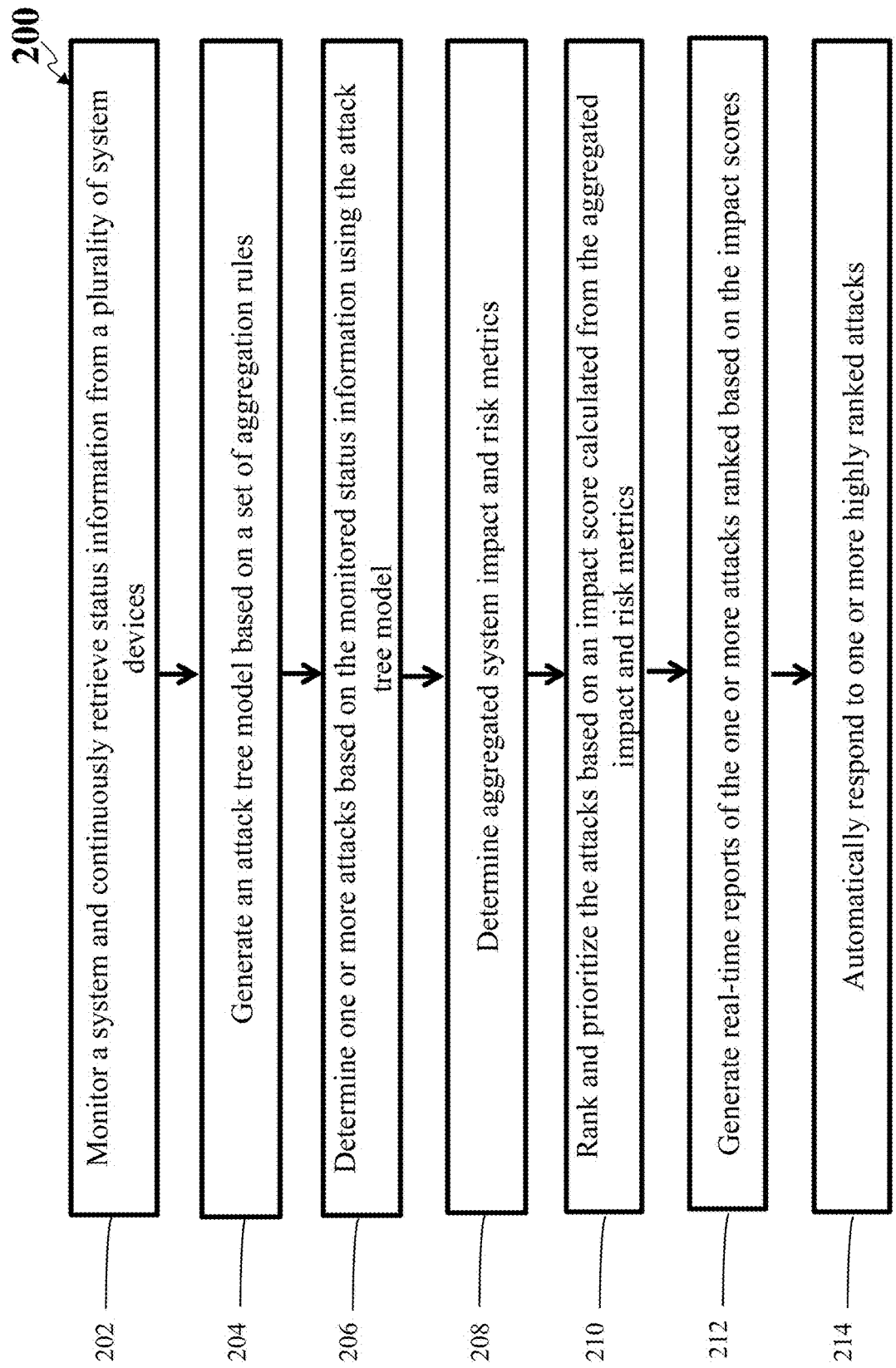
FIG. 2 illustrates a flowchart for continuous compliance of nodes in a system, according to an embodiment.

FIG. 2 illustrates a flowchart 200 for continuous compliance of nodes in a system, according to an embodiment. Other embodiments may comprise additional or alternative steps, or may omit some steps altogether.

At step 202, the analytic server may monitor one or more systems in real-time and continuously retrieve raw data of status information from a plurality of system devices. The analytic server may monitor various devices of network connected and standalone systems. For example, the analytic server may monitor a network system with multiple homogeneous and/or heterogeneous systems by receiving raw data of logging and device status information from sensors and intrusion detection systems. Such devices and systems may be under management of the analytic server. The raw data may comprise a set of variables and metrics retrieved from various system devices. Embodiments disclosed herein may monitor systems over a network or be deployed on a minimal size-weight-and-power (SWAP) device that attaches to a standalone node.

Limitations on low-level components in a network may prohibit direct automated testing. For example, it may be difficult to query status information directly from embedded systems. To address this problem, the analytic server may receive status information from third-party management systems. Specifically, the analytic server may receive logging and device status information from the distributed systems and network via a third-party IDS (intrusion detection system) or SIEM (security information and event management). The third-party IDS or SIEM may plug in the existing systems, aggregate the information and events from various systems and devices and import the alerts and events into the analytic server. Such third-party management systems may provide the ability to query a target for a much larger list of status information and to draw information about low-level components.

The analytic server may accept asynchronous data from external sources. The analytic server may receive the raw data of logging and device status information via standard formats including syslog and SNMP. Syslog data may enable remote logging for secure historical records. The analytic server may monitor SNMP data via polling or asynchronously via SNMP Trap mechanism. SNMP Traps are alert messages sent from a remote SNMP-enabled device to the analytic server. SNMP Traps are a way of allowing SNMP-enabled devices to send asynchronous notifications to notify the analytic server of significant issues and events.

The analytic server may implement a basic TAXII (trusted automated exchange of intelligence information) server to accept STIX (structured threat information expression) formatted messages from intrusion detection systems and other STIX-capable tools. TAXII is an HTTP (hypertext transfer protocol) style protocol, which may ease implementation of the embodiments disclosed herein.

At step 204, the analytic server may generate an attack tree model for the system based on a set of aggregation rules. The set of aggregation rules may be configured based on the monitored device status information comprising a set of variables and metrics of various system devices. The attack tree model may be in a hierarchical structure comprising a root node, one or more parent nodes, and one or more child nodes, the root node and each parent node representing a higher-level operating condition of an attack, and each child node representing a lower-level operating condition of the attack. From the bottom up, child nodes are conditions which must be satisfied to make the direct parent node true; when the root is satisfied, the attack is complete. Each node may be satisfied by its direct child nodes. The set of aggregation rules may determine the lower-level operating conditions of an attack for the child nodes, the higher-level operating conditions of the attack for the parent nodes in the attack tree model and the relationships between the child nodes and the parent nodes.

The attack tree model may be an executable logic for detecting attacks. The attack detection rules may be from user configuration and/or local knowledge in the database. The analytic server may build the attack tree based on a set of aggregation rules and other attack detection rules, which dictate how various metrics are computed in terms of lower-level data. The analytic server may support a large set of aggregation functions and other attack detection rules.

The attack tree model for the distributed system may comprise a plurality of sub attack trees corresponding to a plurality of sub-systems within the distributed system. Each sub-system may have a set of attributes and configurations different from each other. For a first network sub-system, the analytic server may instantiate a first sub attack tree based on aggregation rules, metadata, and various attributes of the first network sub-system. For a second network sub-system, the analytic server may instantiate a second sub attack tree based on aggregation rules, metadata, and various attributes of the second network sub-system.

In some embodiments, the analytic server may provide a graphical user interface (GUI) for the analyst/user to define customer functions and rules. By interacting with the user interface, the analyst may be able to associate different metadata, various attributes with items of the attack tree and test the systems in various ways. In some other embodiments, the analytic server may retrieve the functions and rules from the local knowledge database. Based on the aggregation rules and attack detection rules, the analytic server may generate the attack tree model that shows how a large system can be attacked, and describes threats on computer systems and possible attacks to realize those threats. FIG. 3 illustrates an example of attack tree model. In some embodiments, the analytic server may update the attack tree model as results are available.

The analytic server may utilize the attack tree model to compute aggregate metrics, such as CVSS vectors, based on the monitored raw data from system devices. Specifically, the analytic server may follow the logic of the attack tree model by traversing the attack tree model from bottom up. The analytic server may use the set of aggregation rules of the attack tree model to define how metrics at a single level of the attack tree model are computed in terms of metrics from the next level down. For example, a CVSS impact score for a set of servers may be the maximum CVSS impact value for all constituent servers.

While the analytic server may allow arbitrary aggregation functions to be defined, the analytic server may provide support for customizing the user interface to facilitate the definition of aggregation rules common in real-time intrusion alert systems. The aggregation rules may serve to correlate sensor data from servers, endpoints, network devices, and existing IDS in a mission/system-specific manner. Such a feature may give added value to the embodiments disclosed herein models: by knowing the context of an alert, the system may compute the impacts to overall mission success. For example, because the sensor data and other device status data provide context of one or more alerts, the analyst may define the aggregation rules more accurately. As a result, the analytic server may compute the impact scores of various nodes more accurately and provide more accurate guidance to the analyst/user.

In some embodiments, the analytic server may use machine learning techniques to determine aggregation rules. Specifically, the analytic server may determine the set of aggregation rules by executing a machine learning model. The analytic server may train the machine learning model based on aggregation rules received from the analyst. The machine learning model may learn from the user configuration and further determine new aggregation rules.

Furthermore, the security system described herein may be extensible. The analytic server may extend the system by allowing third-party cyber data processing systems to be plugged into the hierarchical risk model (e.g., attack tree model).

At step 206, the analytic server may detect one or more attacks on the system based on the monitored raw data using the attack tree model. The analytic server may detect one or more attacks on the system by associating the status information with corresponding nodes of the attack tree model and executing the logic of the attack tree model.

Specifically, the analytic server may associate the raw data with appropriate attack tree model nodes that represent the devices producing the raw data. As discussed above, the raw data may be a set of variables including logging information, device status, alerts, events received from various devices and systems under management. Based on the logging information, alerts, events received from various devices and systems under management, the analytic server may determine attacks by executing the logic of the attack tree model. Specifically, the analytic server may follow the logic of the attack tree model by traversing the attack tree model from bottom up (e.g., from the one or more child nodes to respective parent node) and determine aggregated results based on the raw data. For example, the analytic server may determine if the logging information, alerts and events data satisfy the operating conditions of the nodes. From the bottom up, child nodes are lower-level operating conditions of an attack, at least one of the child nodes must be satisfied to make the direct parent node true, the parent node may represent higher-level operating condition; when the root is satisfied (e.g., the highest level operating condition is satisfied), the attack is complete. The aggregated results may include the operating conditions being satisfied on the child nodes and the parent nodes.

The analytic server may perform automated evaluations and computations over the attack tree model, testing on-line to see whether particulate vulnerabilities are present or known-weak configurations or libraries are in use. In addition, by correlating information from multiple sources, the analytic server may be able to learn context for alerts and distinguish likely false alarms, as well as true, but unimportant, alerts. Thus, the analytic server may reduce false positives and cognitive load the false positives may cause.

At step 208, the analytic server may determine aggregate results (e.g., aggregated system impact and risk metrics) in real-time in the process of executing logic of the attack tree model. By traversing the attack tree model, the analytic server may determine the operating conditions being satisfied on the child nodes and the parent nodes of the attack tree. The analytic server may further determine the system impact and risk metrics corresponding to such operating conditions. After determining a set of impact and risk metrics from multiple data sources, the analytic server may calculate aggregated system impact and risk metrics (e.g., CVSS vectors) for the whole system.

The analytic server may correlate context and configuration data from disparate servers, endpoints, and network sensors and determine overall system risk. The analytic server may not only determine if the combination of correlated data indicates an attack, but also how much of an impact the attack might have. For example, the analytic server may determine various security-relevant metrics for the mission system as a whole, such as impacts, potential for loss of life, remediation cost, and the like. As data arrives, the analytic server may re-compute the metrics in real-time. The analytic server may compute (or update) impact metrics in terms of lower-level alerts and indicators from server, endpoint, and network sensors or intrusion detection systems. The analytic server may provide computed scores, such as CVSS scores, to rank indicators and alerts.

At step 210, the analytic server may rank and prioritize the attacks based on an impact score calculated from the aggregated results (e.g., aggregated impact and risk metrics) and display the attacks based on the ranking. As discussed above, after determining a set of impact and risk metrics from multiple data sources, the analytic server may calculate aggregated metrics (e.g., CVSS vectors) for the whole system. Furthermore, the analytic server may calculate an impact score (e.g., CVSS score) based on the aggregated impact and risk metrics. The common vulnerability scoring system (CVSS) is a standard for assessing the severity of computer system security vulnerabilities. The CVSS may assign severity scores to vulnerabilities, allowing responders to prioritize responses and resources according to threat severity. Scores are calculated based on a formula that depends on several metrics that approximate ease of exploit and the impact of exploit.

The analytic server may use the set of aggregation rules of the attack tree model to determine the impact scores for the attack tree nodes. The analytic server may rank attack indicators and alerts based on the impact scores and display the attacks on a user interface based on the ranking. The analytic server may show the context and impacts of alert on the user interface. As a result, the analyst may easily see which alerts have the most significant "big picture" impact and which can be triaged for later assessment by low-level personnel. When cost or other metrics are available within the model, the analyst can easily see which strategies have the most significant impact for the least cost or least mission disruption. Thus, the embodiments disclosed herein may help triage unimportant issues from critical ones, save time and mental effort by subject matter experts (SME), maximize the effectiveness of limited SME time in real-time monitoring high value IT assets.

At step 212, the analytic server may generate real-time reports of the one or more attacks in standard formats. The analytic server may display the report in a dashboard of a user interface. In some other embodiments, the analytic server may rank and prioritize the list of the one or more attacks based on the impact scores. The analytic server may display the reports in the dashboard based on the ranking. The reports in the dashboard may comprise the list of the prioritized attacks. The reports may also comprise security overview results. The analytic server may continuously retrieving the real-time status information from the various devices within the system and may dynamically update reports in the dashboard as new status information becomes available. In addition, upon the impact scores of the one or more attacks satisfying a second threshold, the analytic server may generate an immediate electronic alert message for each attack and send the electronic alert messages to the analyst in real-time to notify the analyst of the attacks.

Figure 4:
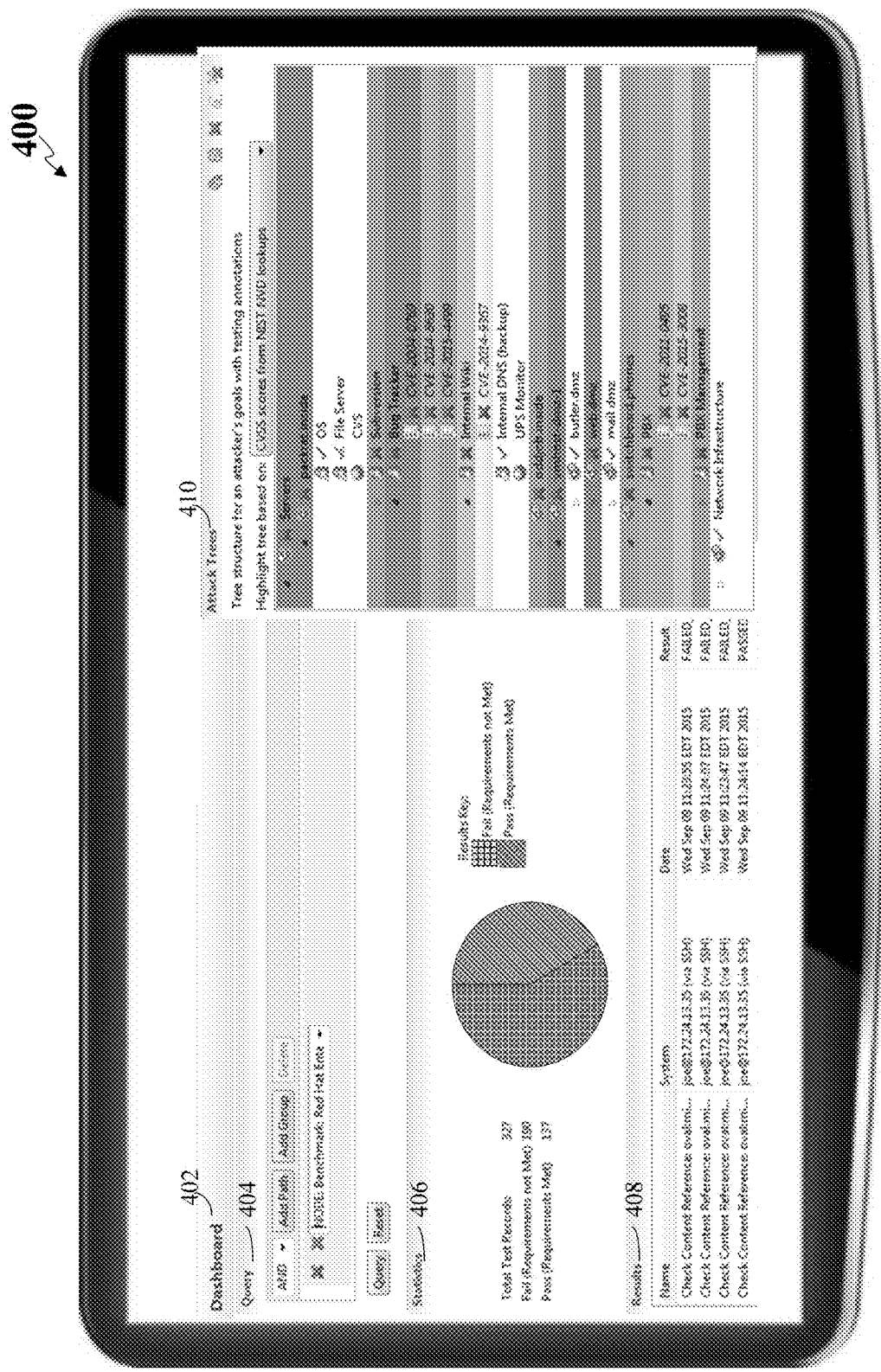
FIG. 4 illustrates an example of a graphical user interface for attack reports, according to an embodiment.

The analytic server may be able to produce machine-readable alerts and human-readable reports to fit within an organization's cybersecurity ecosystem. The analytic server may support visualization and PDF (portable document format) report-generation capabilities. FIG. 4 illustrates an example of a user interface for test records and attack reports. The analytic server may support generating alerts (e.g., electronic alert messages) via syslog, email, and STIX+TAXII (structured threat information expression and trusted automated exchange of intelligence information) when analyst-defined conditions occur (e.g., a high-impact attack found with a particular likelihood). In responding to alerts, the analyst may bring up their copy of the application report to examine visualizations or drill deeper into the indicators of compromise. Email alerts may include a PDF report with detailed visualizations as an attachment. These alerts may occur in real-time, as data comes in and computed metrics or the impact scores exceed thresholds. For example, as discussed above, upon the impact score of an attack satisfying a threshold, the analytic server may generate an electronic alert message comprising a report of the attack to notify an analyst.

The analytic server may define a plug-in application programming interface (API) for generating alerts in arbitrary formats. The API may provide the automated response algorithm with information on the expected impacts or disruption, both of which are critical in deciding whether to take automated action.

Internally, the analytic server may use straightforward extensible markup language (XML) for data storage and processing and keep raw data in its native formats for forensic purposes. By combining such features, the analytic server may facilitate integration with other data processing tools. For instance, one could write an XSLT (extensible stylesheet language transformations) script that generates HTML (hypertext markup language) reports from the system test records.

At step 214, upon the impact scores of the highly ranked attacks satisfying a threshold, the analytic server may automatically respond to one or more highly ranked attacks by taking automated actions to mitigate system impacts of the attacks. The automated actions may reconfigure the devices associated with the highly ranked attacks based on system configuration policies. In some embodiments, the automated actions may revert the device state to the state of a previous time point, which can be used to recover from system malfunctions or other problems. The analytic server may automate responses that are consistent with system configuration, overall mission needs, and priorities. The automated responses may prevent intrusions and/or reduce the impacts of the intrusions. The automated responses may resolve issues without user intervention. As a result, the embodiments disclosed herein may apply automated actions/measures on noncompliant configurations and malicious behaviors and automate intrusion detection and prevention. The embodiments disclosed herein may automatically maintain system health and security with minimum or zero user intervention and lay the groundwork for automated responses.

In some embodiments, the analytic server may train a response model by utilizing machine learning techniques for the automated responses. For example, for some of the alerts and attacks, the user (e.g., analyst) may take actions to mitigate the impacts based on the corresponding reports in the dashboard. The analytic server may record the user actions in a historical database. The analytic server may train the response model by learning from the historical user actions for different alerts and attacks.

In some other embodiments, the analytic server may provide recommendation actions in the dashboard for test records and attack reports. For example, the reports may comprise security overview results and recommendation actions for the system to mitigate the one or more attacks. The recommendation actions may include possible mitigation and further testing suggestions. As the user responds to the attacks, the analytic server may record whether the user adopts the recommended actions. If the user selects to adopt the recommended action for a certain attack for multiple times (e.g., satisfying a threshold value), the analytic server may train the response model based on the user's selection and perform automated response for the particular attack and other relevant attacks.

FIG. 3 illustrates an example of an attack tree model 300, according to an embodiment. The attack tree may show how a target can be attacked or describe threats to a system. The attack tree model may show how an adversary's aims can be achieved in terms of sub-goals and system configuration choices. The attack tree model may be a multi-level diagram consisting of one root, parent nodes, and child nodes. From the bottom up, child nodes are conditions, which may have to be satisfied to make the direct parent node true; when the root is satisfied, the attack is complete. Each node may be satisfied only by its direct child nodes. A node may be the child of another node; in such a case, it becomes logical that multiple steps may have to be taken to carry out an attack.

The figure shows an example of an attack tree model that describes an attack on degrading weapon cueing 302 in a military system. The top level goal of degrading weapon cueing 302 is at the root of the attack tree model. The children of the goal are sub-goals, such as degrading a GPS (global positioning system) sensor's accuracy 304 or manipulating a crucial program to disable the GPS 306. Sub-goals may be disjunctive (one of the sub-goals must be met) or conjunctive (all sub-goals must be met). Leaf sub-goals are those that might be met because of a vulnerability in the system. For example, to disable the GPS 306, an attacker may exploit a known privilege escalation vulnerability 308, perform a jamming attack 310, and/or remove drivers 312. To determine whether the leaf nodes are satisfies, the analytic server may need to monitor and collect test results of system devices.

The analytic server may detect attacks and determine overall goals and risks on the system by traversing the attack tree model from bottom up. In operation, the analytic server may collect the test results of low-level testable items. From the bottom up, the analytic server may perform computation based on the test results using the attack tree model logic.

In the process of traversing the attack tree model from the bottom up, the analytic server may determine the threat likelihood, impact, remediation cost on each node of the attack tree model. The analytic server may use the attack tree model based impact modeling to produce multi-layer reports. In addition to the threats and their impacts, the report may reveal lower level sub-threats, giving an analyst a detailed security overview of the system. After the traversing of attack tree model reaches the root node, the analytic server may generate a report comprising security overview results and recommendation actions for the whole system. The report may comprise a list of action items for improving the system security. For example, the report may include possible mitigation and further testing suggestions. The list of action items may be ordered by the impact scores and/or cost.

The analytic server may argument the attack tree models with structural enhancements to better describe risks to embedded systems. For automated evaluation, the analytic server may make use of NIST (National Institute of Standards and Technology) security content automation protocol (SCAP) standards, such as the open vulnerability and assessment language (OVAL), common weakness enumeration (CWE), and the common vulnerabilities and exposures (CVE) database. SCAP leverages DISA (defense information system agency) security technical implementation guidelines (STIGs) baselines to report the current compliance level of an information system. In addition to SCAP-based testing, the analytic server may also execute commands directly on the distributed system's nodes using secure shell (SSH). The analytic server may analyze test results and up-to-date CVE results and summarize the analysis results in a dashboard format that lets the analyst pinpoint critical risks and the most cost-effective means to address the risks.

FIG. 4 illustrates an example of a user interface for test records and attack reports 400, according to an embodiment. The user interface for test records may include a dashboard 402 that displays the elements of query 404, statistics 406, and results 408. The element of query 404 may allow the analyst to issue a specific test query. The element of statistics 406 may display the test result statistics, such as the total test records, failed records, and pass records. The element of results 408 may display detailed test information on each record, such as the name, system, date, and test result (e.g., failed or passed). The user interface for attack reports may display the attack report as attack trees 410. For example, the attack reports may be in a tree structure with highlighted items based on the impact scores. In some embodiments, the analytic server may highlight the attacks or threats with different colors based on the impact scores. For example, attacks or threats with high impact scores may be highlighted in a red warning, attacks and threats with medium impact scores may be highlighted in an orange warning, and attacks and threats with low impact scores may be highlighted in a yellow warning.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for detecting attacks on distributed systems, the method comprising:

obtaining, by a server, status information of a plurality of devices of a distributed system in an operational environment, the status information including a status for a device of the plurality of devices;

generating, by the server, an attack tree model for the distributed system using a set of aggregation rules associated with the status information of the plurality of devices, wherein the status information of the plurality of devices is associated with one or more corresponding nodes of the attack tree model, the attack tree model comprising a plurality of nodes including one or more parent nodes and one or more child nodes, wherein a node of the plurality of nodes includes the status of the device of the plurality of devices;

detecting, by the server executing a logic of the attack tree model, one or more attacks according to the status information associated with the one or more corresponding nodes of the attack tree model, wherein executing the logic of the attack tree model includes traversing the attack tree model from the one or more child nodes to respective parent nodes;

determining, by the server, using a response model, responsive to detecting the one or more attacks, one or more automated actions based on the one or more attacks and impact scores for the one or more attacks corresponding to the status information; and executing, by the server, the one or more automated actions in the operational environment responsive to detecting the one or more attacks, including reconfiguring at least one device associated with the one or more attacks.

2. The method of claim 1, wherein traversing the attack tree model includes determining, by the server, that an operating condition of a respective parent node is satisfied in response to the server determining that a respective operating condition of at least one of the one or more child nodes is satisfied.

3. The method of claim 1, wherein the attack tree model comprises a first sub attack tree corresponding to a first sub-system and a second sub attack tree corresponding to a second sub-system.

4. The method of claim 1, wherein the automated actions include automatically installing secure configurations to one or more devices of the plurality of devices associated with the one or more attacks.

5. The method of claim 1, wherein the automated actions include reverting states of one or more devices of the plurality of devices associated with the one or more attacks to states of previous time points.

6. The method of claim 1, further comprising determining, by the server, the set of aggregation rules by applying a machine learning model on the status information of the plurality of devices.

7. The method of claim 1, further comprising training, by the server, the response model to implement the automated actions by applying the response model on historical user actions.

8. The method of claim 1, further comprising generating, by the server, a report comprising a list of the one or more attacks in portable document format (PDF).

9. The method of claim 1, wherein obtaining the status information includes retrieving, by the server, the status information of the plurality of devices via an intrusion detection system.

10. The method of claim 1, wherein obtaining the status information includes retrieving, by the server, the status information of the plurality of devices via one or more minimal size-weight-and-power (SWAP) devices attached to one or more devices of the plurality of devices.

11. A system comprising:
a server in communication with a plurality of devices of a distributed system and comprising a processor and a non-tangible computer readable medium with instructions configured to be executed by the processor, the server configured to:

obtain status information of a plurality of devices of a distributed system in an operational environment, the status information including a status for a device of the plurality of devices;

generate an attack tree model for the distributed system using a set of aggregation rules associated with the status information of the plurality of devices, wherein the status information of the plurality of devices is associated with one or more corresponding nodes of the attack tree model, the attack tree model comprising a plurality of nodes including one or more parent nodes and one or more child nodes, wherein a node of the plurality of nodes includes the status of the device of the plurality of devices;

detect, by executing a logic of the attack tree model, one or more attacks according to the status information associated with the one or more corresponding nodes of the attack tree model, wherein the server is configured to traverse the attack tree model from the one or more child nodes to respective parent nodes;

determine, using a response model, responsive to detecting the one or more attacks, one or more automated actions based on the one or more attacks and impact scores for the one or more attacks corresponding to the status information; and execute the one or more automated actions in the operational environment responsive to detecting the one or more attacks, including reconfiguring at least one device associated with the one or more attacks.

12. The system according to claim 11, wherein, when traversing the attack tree model, the server is further configured to determine that an operating condition of a respective parent node is satisfied in response to the server determining that a respective operating condition of at least one of the one or more child nodes is satisfied.

13. The system according to claim 11, wherein the attack tree model comprises a first sub attack tree corresponding to a first sub-system and a second sub attack tree corresponding to a second sub-system.

14. The system according to claim 11, wherein the automated actions include automatically installing secure configurations to one or more devices of the plurality of devices associated with the one or more attacks.

15. The system according to claim 11, wherein the automated actions include reverting states of one or more devices of the plurality of devices associated with the one or more attacks to states of previous time points.

16. The system according to claim 11, wherein the server is further configured to determine the set of aggregation rules by applying a machine learning model on the status information of the plurality of devices.

17. The system according to claim 11, wherein the server is further configured to train the response model to implement the automated actions by applying the response model on historical user actions.

18. The system according to claim 11, wherein the server is further configured to generate a report comprising a list of the one or more attacks in portable document format (PDF).

19. The system according to claim 11, wherein, when obtaining the status information, the server is further configured to retrieve the status information of the plurality of devices via an intrusion detection system.

20. The system according to claim 11, wherein, when obtaining the status information, the server is further configured to retrieve the status information of the plurality of devices via one or more minimal size-weight-and-power (SWAP) devices attached to one or more devices of the plurality of devices.

* * * * *